United States Patent [19]

Ufermann

[11] 4,315,722

[45] Feb. 16, 1982

[54] APPARATUS FOR FORMING A MAT FOR MAKING PARTICLEBOARD

[75] Inventor: Werner Ufermann, Bernried, Fed. Rep. of Germany

[73] Assignee: G. Siempelkamp GmbH & Co., Krefeld, Fed. Rep. of Germany

[21] Appl. No.: 98,507

[22] Filed: Nov. 29, 1979

[30] Foreign Application Priority Data

Nov. 30, 1978 [DE] Fed. Rep. of Germany ....... 2851779

[51] Int. Cl.³ ............................................ B29J 1/00

[52] U.S. Cl. .................................... 425/83.1; 264/113

[58] Field of Search ......................... 425/83.1; 264/113

[56] References Cited

U.S. PATENT DOCUMENTS 3,115,431 12/1963 Stokes et al. ........................ 264/113

4,063,858 12/1977 Axer et al. ......................... 425/81.1

4,068,991 1/1978 Ufermann .......................... 425/81.1

*Primary Examiner*—James R. Hall

*Attorney, Agent, or Firm*—Karl F. Ross

[57] ABSTRACT

A mat of elongated particles is formed on a horizontal and horizontally displaceable conveyor by a spreading head having an array of parallel interdigitated disks forming longitudinally elongated spaces and rotatable about coplanar axes above the conveyor. The conveyor is continuously displaced in a longitudinal transport direction and generally perpendicular to these axes underneath the spreading head. Elongated particles are fed onto the array of disks while these disks are rotated so that the particles are deposited onto the conveyor as a mat having underneath the array a generally planar upper mat surface forming with the conveyor a deposition angle. The array is supported so that the plane of its axes lies in an acute angle to the upper mat surface. The array is much closer to the upper surface at its upstream portion than at its downstream portion so that the particles are deposited on the conveyor generally parallel to the longitudinal transport direction underneath the upstream portion and generally randomly underneath the downstream portion.

3 Claims, 4 Drawing Figures

APPARATUS FOR FORMING A MAT FOR MAKING PARTICLEBOARD

FIELD OF THE INVENTION

The present invention relates to an apparatus for forming a mat of elongated particles. More particularly this invention concerns such an apparatus used in the initial steps of manufacturing particle board.

BACKGROUND OF THE INVENTION

A particle board is formed by compressing a layer of particles, generally a mixture of cellulosic or other particles, with a binder in a platen or other press at a temperature sufficient to activate the binder. The particles normally consist of wood chips, splinters, sawdust, and fibers and the majority of the particles are normally elongated. The binder is normally a thermally activatable synthetic resin which is mixed with the particles, or it is a resin which is intrinsically present in the wood. When a layer or mat of such particles is subject to heat and compression the binder is activated to bind the particles into a coherent sheet known in the art as a particle board.

It is well known from the commonly owned earlier U.S. Pat. Nos. 4,063,858 and 4,068,991 of Dec. 20, 1977 and Jan. 17, 1978, respectively, to form the mat for making such a particle board by dispensing the particulate material onto a conveyor by means of an array of so-called disk rollers. These disk rollers each comprise a plurality of parallel disks rotatable about a common axis, with the disks inter-digitated and all of the axes lying substantially in a common plane. The disks are all rotated in the same direction so that their upper portions move in a horizontal transport direction which is identical to the transport direction of the upper reach of a conveyor belt or other surface extending along underneath and parallel to the array of disk rollers.

Wood particles are fed onto the downstream end of this array of disk rollers which form vertically throughgoing spaces that increase in cross-sectional area from the downstream portion to the upstream portion of the array, normally by providing fewer disks on the upstream rollers than on the downstream rollers. The material is thus classified, with the smaller particles falling through the downstream portion and the larger particles falling through the upstream portion of the array. A particulate mat is therefore formed underneath this array which has an upper mat surface that forms with the conveyor surface an acute deposition angle open in the downstream direction. In the above-discussed system the array of rollers is perfectly parallel to the conveyor surface and situated well above the conveyor surface so that, although the particles are classified with the smaller particles falling through the array at the upstream end and the larger particles falling through at the downstream end, the direction of elongation of the particles in the mat is virtually random.

It is known also from U.S. Pat. No. 3,115,431 issued Dec. 24, 1963 to STOKES and YAN to closely juxtapose the array with the conveyor surface, and indeed to orient the plane of the axes of the disk rollers perfectly parallel to the upper mat surface underneath the array. In this manner it is possible to deposit the particles so that they lie principally parallel to the transport direction. Such a system has been found extremely useful in that it produces a board which has extremely good strength in at least this one direction. What is more, it makes an extremely compact board.

The boards made with particles arranged generally randomly are advantageous in that they have approximately the same strength in all directions. The boards made of particles which are aligned parallel to each other have excellent strength in one direction, but are relatively weak in another. Furthermore these boards with parallel particles are frequently so very dense that it is difficult to nail through them, and they are likely to split. Nonetheless, the parallel-fiber boards have a surface appearance almost resembling that of natural wood.

OBJECTS OF THE INVENTION

It is therefore an object of the present invention to provide an improved apparatus for forming mats suitable for pressing into particle board.

Another object is to provide such an apparatus which allows a mat to be made that can be pressed into a particle board having the advantages of the random-fiber boards as well as the advantages of the parallel-fiber boards.

SUMMARY OF THE INVENTION

These objects are attained according to the instant invention in a system of the type described generally above, but wherein support means are provided for orienting the plane of the diskroller axes at an acute angle to the upper mat surface with the array so much closer to the upper surface of its upstream portion than at its downstream portion that particles are deposited on the conveyor generally parallel to the direction underneath the upstream portion and generally randomly underneath the downstream portion. Since the particles only fall a very short distance between the upstream portion of the array and the mat, they remain oriented parallel to the direction of travel since the interdigitated disks form slots extending in the direction of travel. On the other hand at the downstream end of the array the particles fall a relatively long distance, so that these particles become disoriented and fall virtually randomly. What is more, the classification of fine particles upstream and coarse particles downstream ensures that a particle board formed of such a mat will have a fine, smooth surface formed by relatively fine parallel fibers, whereas the core of such a board will be formed of overlapping coarser particles. As a result the board will have an extremely good appearance, but will nonetheless be strong in all directions.

In a mat produced according to the instant invention the coarseness of the particles will increase in the downstream direction. Similarly the uniformity of parallelism between the particles will decrease in the upward direction. It is possible according to this invention to then deposit another layer of particles on top of such a mat, in accordance with above-mentioned U.S. Pat. No. 3,115,431 so that in effect the mat thus produced will have outer surfaces formed of parallel particles, whereas the core of the board will be of random particles. To achieve this the conveyor may merely be reversed so that the mat can be run again in the transport direction under the set of rollers which is reset to lie exactly at the level of the upper surface of the layer that is deposited on it. Of course a second set of rollers can be provided.

SPECIFIC DESCRIPTION

Figure 4:
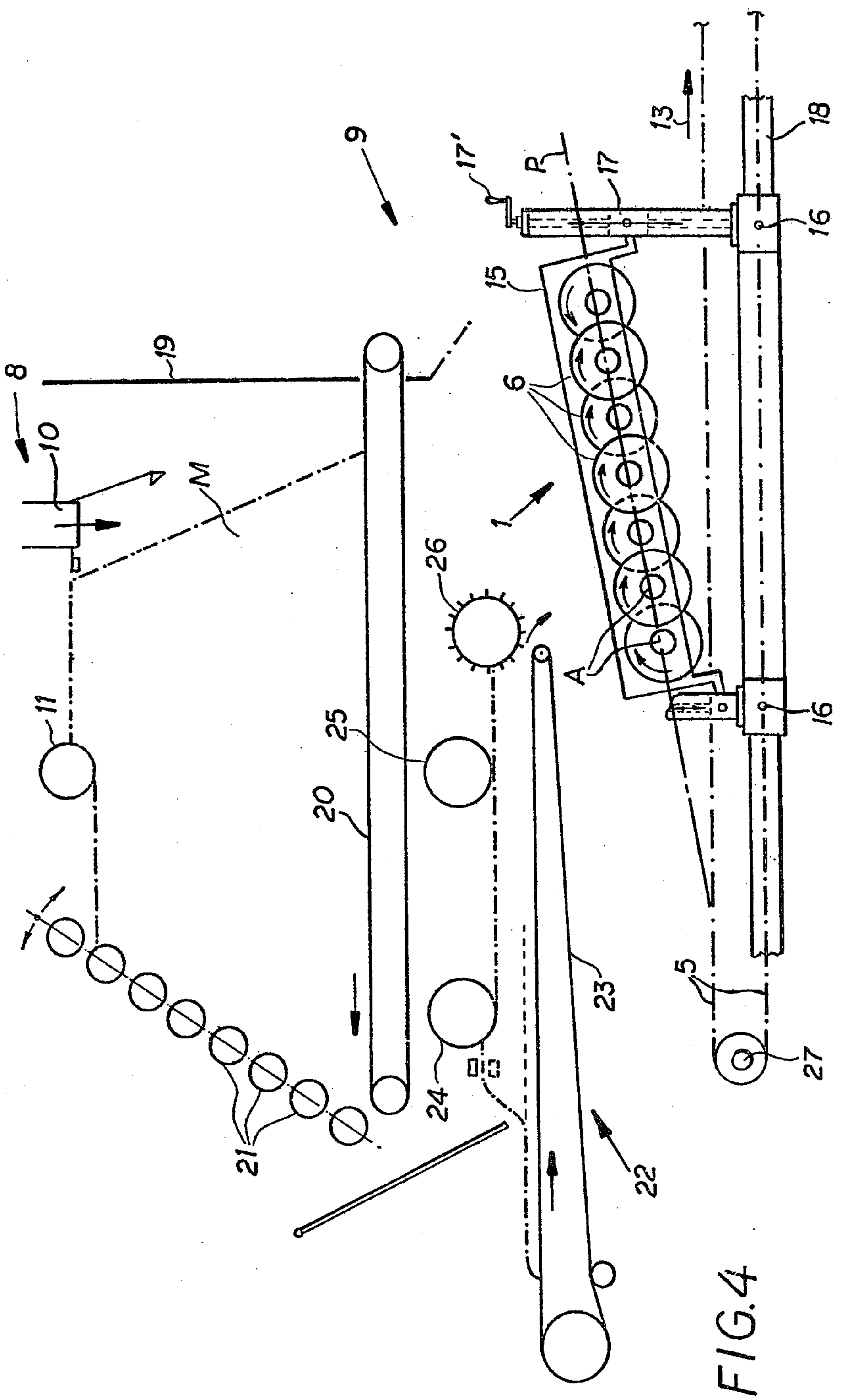
FIG. 4 is a side partly diagrammatic view illustrating the entire apparatus according to this invention.

With reference first to FIG. 4 the system according to the cited U.S. Pat. No. 4,063,858. A feed apparatus indicated generally at 9 has a particle supply 8 and a metering arrangement 22. The particle supply 8 is fed with particles via an auger-type input tube 10 provided adjacent a spreader-roller 11 and a hopper wall 19. The particle material M is deposited onto a conveyor belt 20 and fed via a roller grate 21 down onto a metering conveyor belt 23. A volume-metering roller 24 and weight-metering roller 25 form a smooth layer on the conveyor belt 23 and a cast-off drum 26 deposits the particle material onto the top of an array 1 of disk-rollers 6 forming a spreading head and of the exact type described in U.S. Pat. Nos. 4,063,858 and 4,068,991. As seen in FIGS. 5 and 6 the disks 6' of these rollers 6 are interdigitated and rotate about axes A lying in a plane P. The disks 6' form spaces 5 which extend in the plane P and perpendicular to the axis A. The size of these spaces 5 increases the exact type described in U.S. Pat. Nos. 4,063,858 and 4,068,991. The array 1 of disk rollers 6 is carried on a support frame 15 mounted at its ends on supports 16 and vertically displaceable by means of a adjustment mechanism 17 operated by a crank 17' for movement relative to a main support beam 18 to vary the angle the plane P forms with the horizontal.

Figure 1:
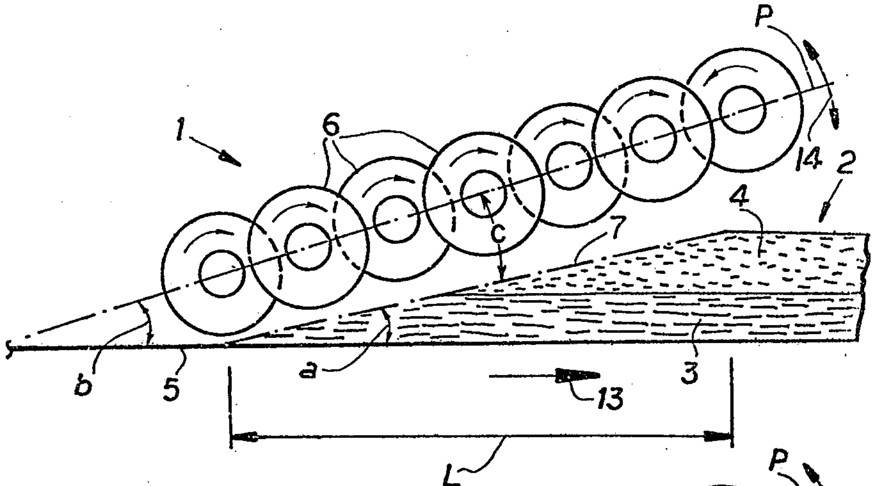
FIGS. 1, 2, and 3 are side views illustrating the operation of the spreading head according to the instant invention.

More particularly as shown in FIGS. 1 and 4, all but the furthest downstream roller are rotated in the same direction so that their upper edges move downstream, but the furthest downstream roller 6 rotates in the opposite direction. The furthest upstream disk roller is closely juxtaposed to a horizontal transport surface formed by the upper reach of a conveyor belt 5 that is moved continuously by a motor 27 in the transport direction. The plane P forms an angle b with this horizontal surface, and operation of the adjustment device 17 allows this angle b to be varied as indicated by arrow 14.

The particles in the mass M are mainly elongated chips and fibers, and are of different sizes. They are deposited to form a mat 2 comprised of a lower layer 3 of relatively fine particles arranged parallel to each other and an upper layer 4 of coarser particles arranged generally randomly. The upper surface 7 in the deposition region, which has a length L in the transport direction 13, forms a deposition angle a with the horizontal transport surface formed by the conveyor 5 which is smaller than the angle b. Thus the plane P forms an acute angle c with the surface 7 so that the upstream portion of the array 1 is much closer to this surface 7 than the downstream portion.

In FIG. 1 the layers 3 and 4 are shown as distinct layers, but in reality the randomness of the particles increases in the upward direction fairly uniformly, as does the coarseness of the particles that pass through the disk rollers 6.

Figure 2:
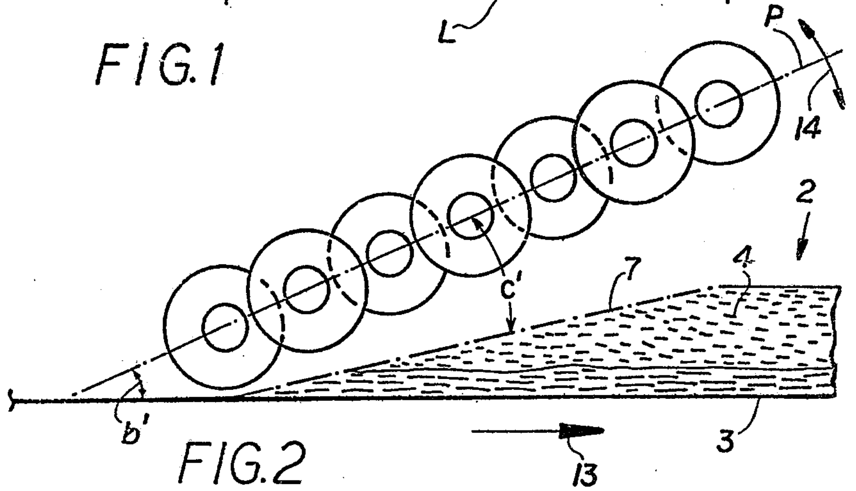

FIG. 2 shows how the angle of the plane P can be increased to a larger angle b', so that the layer 3 is decreased in thickness and the layer 4 is increased, or more accurately, the parallelism of the particles forming the mat 2 decreases rapidly in the downstream direction. This creates an angle c' greater than the angle c of FIG. 1.

Figure 3:
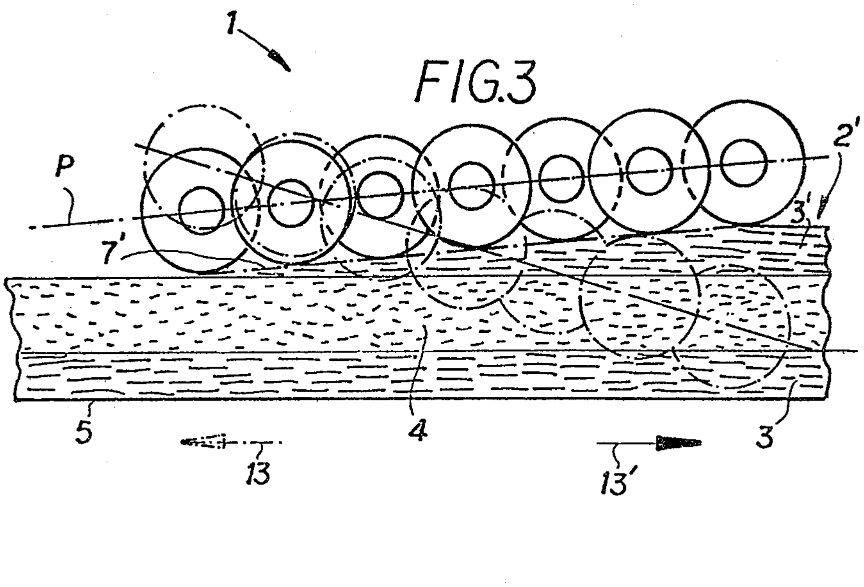

FIG. 3 shows how once two layers 3 and 4 such as shown in FIG. 1 have been deposited with the rollers 6 in the position indicated in dot-dash lines, it is possible to reverse the direction to displace the layers 3 and 4 back in a direction 13' under the array 1, then to reorient this array 1 as shown in solid lines so that the plane p lies directly parallel to a surface 7'. This forms another layer 3' so that a mat 2' is formed having three layers, a pair of outer layers 3 and 3' with parallel fibers or particles and a central core 4 of generally random particles or fibers. To this end the lower side of the disks of contact plane P is the surface 7' substantially in the manner described in the above-cited U.S. Pat. No. 3,115,431.

With the system according to the instant invention it is therefore possible to produce a mat which can subsequently be subdivided and pressed into particleboard that will have one or both surfaces formed of parallel fibers or chips. As a result the particleboard will have an extremely good appearance, and will have extremely good strength parallel to this direction, which is normally in the long direction of the panels formed the mat. At the same time the board will have a randomly arranged core so that nails driven into it will not split it.

I claim:

1. An apparatus for forming a mat of elongated mainly wood particles, said apparatus comprising:

- a conveyor having a horizontal and horizontally displaceable transport surface;
- a spreading head having an array of parallel interdigitated disks forming longitudinally elongated spaces and rotatable about coplanar axes above said conveyor;
- means for continuously displacing said transport surface in a longitudinal transport direction generally perpendicular to said axes, said transport surface having relative to said direction and underneath said array of disks an upstream portion and a downstream portion;
- means for feeding elongated mainly wood particles onto said array of disks to orient the particles parallel to said direction while rotating said disks to deposit said particles onto said conveyor as a mat having underneath said array a generally planar upper mat surface forming with said conveyor a deposition angle; and
- support means for orienting the plane of said axes at an acute angle to said upper mat surface with said array so much closer to said upper surface at its said upstream portion than at its said downstream portion that particles fall through a relatively short distance and are deposited on said surface of said conveyor generally parallel to said direction underneath said upstream portion and fall through a relatively long distance and are deposited generally randomly underneath said downstream portion.

2. The apparatus defined in claim 1, further comprising means for varying the angle said axes form with said conveyor.

3. The apparatus defined in claim 1 wherein said spaces increase in dimension parallel to said axes in a downstream direction, whereby larger particles pass through said downstream portion and only smaller particles pass through said upstream portion.

* * * * *